(12) United States Patent
Sun

(10) Patent No.: US 8,711,557 B2
(45) Date of Patent: Apr. 29, 2014

(54) SUPPORT TRAY FOR SERVER

(75) Inventor: Zheng-Heng Sun, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 51 days.

(21) Appl. No.: 13/536,403

(22) Filed: Jun. 28, 2012

(65) Prior Publication Data
US 2013/0319961 A1 Dec. 5, 2013

(30) Foreign Application Priority Data

Jun. 1, 2012 (CN) .......................... 2012 1 0178362

(51) Int. Cl.
| | | |
|---|---|---|
| G06F 1/16 | (2006.01) | |
| H05K 5/00 | (2006.01) | |
| A47F 7/00 | (2006.01) | |
| A47F 3/14 | (2006.01) | |
| B65D 6/28 | (2006.01) | |
| B65D 8/18 | (2006.01) | |
| A47B 88/00 | (2006.01) | |
| A47B 81/00 | (2006.01) | |

(52) U.S. Cl.
USPC ............ 361/679.32; 361/679.37; 211/26; 211/126.1; 220/4.02; 220/4.03; 312/348.4; 312/223.2

(58) Field of Classification Search
USPC .......... 211/126.1–126.7, 126.12, 126.14, 26; 206/557–567; 220/4.01–4.03, 528, 220/529; 361/679.31–679.39, 724, 725, 361/726; 248/27.1; 312/348.1, 348.2, 312/348.4, 223.1, 223.2
See application file for complete search history.

(56) References Cited

U.S. PATENT DOCUMENTS

| | | | | |
|---|---|---|---|---|
| 876,235 | A | * | 1/1908 | Quackenboss ............... 47/66.1 |
| 958,857 | A | * | 5/1910 | Dennis ............................ 220/8 |
| 2,369,728 | A | * | 2/1945 | Farkas ........................ 294/168 |
| 2,605,092 | A | * | 7/1952 | Hutchinson et al. ......... 432/241 |
| 2,922,081 | A | * | 1/1960 | Dubin ......................... 361/725 |
| 2,948,624 | A | * | 8/1960 | Watson et al. ............... 426/111 |
| 3,862,689 | A | * | 1/1975 | Taub ......................... 211/126.2 |
| 4,036,542 | A | * | 7/1977 | Courtwright ............. 312/348.2 |
| 4,042,288 | A | * | 8/1977 | Litchfield ................. 312/348.2 |
| 4,102,554 | A | * | 7/1978 | Reimer ..................... 312/223.1 |
| 4,116,513 | A | * | 9/1978 | Ullman, Jr. ............... 312/348.2 |
| 4,337,861 | A | * | 7/1982 | Smart ......................... 206/579 |
| 4,473,166 | A | * | 9/1984 | Breiter ......................... 220/693 |
| 4,852,741 | A | * | 8/1989 | Van Benschoten ........... 206/558 |
| 4,895,326 | A | * | 1/1990 | Nimpoeno et al. .......... 248/27.1 |
| 4,909,406 | A | * | 3/1990 | Wu ................................ 220/8 |
| 5,016,772 | A | * | 5/1991 | Wilk ............................. 220/8 |
| 5,139,186 | A | * | 8/1992 | Loew et al. ................. 224/42.39 |

(Continued)

*Primary Examiner* — Joshua J Michener
*Assistant Examiner* — Devin Barnett
(74) *Attorney, Agent, or Firm* — Novak Druce Connolly Bove + Quigg LLP

(57) ABSTRACT

A support tray for a server includes a main body defining an opening in a front end, and a first cover and a second cover with different sizes. When the first cover is mounted to the front end of the main body, a cover plate of the first cover shields the opening of the main body. Therefore, the main body and the first cover cooperatively bound a first receiving space adapted to accommodate a first computing unit. When the second cover is mounted to the front end of the main body, a cover plate of the second cover shields the opening of the main body. Therefore, the main body and the second cover cooperatively bound a second receiving space adapted to accommodate a second computing unit. The first receiving space is longer than the second receiving space.

2 Claims, 3 Drawing Sheets

(56) References Cited

U.S. PATENT DOCUMENTS

| | | | | |
|---|---|---|---|---|
| 5,222,791 | A * | 6/1993 | Held et al. | 312/348.4 |
| 5,624,037 | A * | 4/1997 | Kozo | 206/565 |
| 5,678,909 | A * | 10/1997 | Cheng et al. | 312/348.2 |
| 5,682,936 | A * | 11/1997 | Higdon, Jr. | 144/345 |
| 5,882,612 | A * | 3/1999 | Riley | 422/300 |
| 5,980,003 | A * | 11/1999 | Huang | 312/223.2 |
| 6,147,862 | A * | 11/2000 | Ho | 361/679.32 |
| 6,239,978 | B1 * | 5/2001 | Liao | 361/756 |
| 6,311,858 | B1 * | 11/2001 | Csiszar | 220/4.03 |
| 6,713,029 | B1 * | 3/2004 | Krafft et al. | 422/300 |
| 7,057,884 | B2 * | 6/2006 | Davidson et al. | 361/679.55 |
| 7,149,081 | B2 * | 12/2006 | Chen et al. | 361/679.36 |
| 7,239,593 | B2 * | 7/2007 | Abe | 369/75.11 |
| 7,464,827 | B2 * | 12/2008 | Meissen | 220/8 |
| 7,483,263 | B2 * | 1/2009 | Chen et al. | 361/679.02 |
| 7,679,900 | B2 * | 3/2010 | Lee et al. | 361/679.39 |
| 7,679,927 | B2 * | 3/2010 | Wu et al. | 361/767 |
| 7,744,048 | B1 * | 6/2010 | McKellery et al. | 248/177.1 |
| 7,826,210 | B2 * | 11/2010 | Cravens et al. | 361/679.39 |
| 7,889,492 | B2 * | 2/2011 | Chen et al. | 361/679.36 |
| 7,983,034 | B1 * | 7/2011 | Mohoney | 361/679.41 |
| 7,985,082 | B2 * | 7/2011 | Sun | 439/131 |
| 8,243,455 | B1 * | 8/2012 | Raymond et al. | 361/727 |
| 8,247,979 | B2 * | 8/2012 | Sun | 315/152 |
| 8,270,151 | B2 * | 9/2012 | Sun | 361/679.33 |
| 8,272,520 | B2 * | 9/2012 | Manzi et al. | 211/194 |
| 8,297,574 | B2 * | 10/2012 | Zhang et al. | 248/221.11 |
| 8,376,178 | B2 * | 2/2013 | Steinberg | 220/571 |
| 8,395,899 | B2 * | 3/2013 | Li et al. | 361/726 |
| 8,456,843 | B2 * | 6/2013 | Wang et al. | 361/724 |
| 8,509,864 | B1 * | 8/2013 | Diebel | 455/575.8 |
| 8,553,418 | B2 * | 10/2013 | Li et al. | 361/725 |
| 8,570,751 | B2 * | 10/2013 | Zhou | 361/726 |
| 8,585,161 | B2 * | 11/2013 | Gong et al. | 312/223.2 |
| 2001/0024357 | A1 * | 9/2001 | Behl | 361/687 |
| 2002/0141151 | A1 * | 10/2002 | Chen et al. | 361/687 |
| 2002/0181197 | A1 * | 12/2002 | Huang | 361/685 |
| 2003/0095377 | A1 * | 5/2003 | Goodman et al. | 361/685 |
| 2003/0099089 | A1 * | 5/2003 | Chen | 361/685 |
| 2004/0032709 | A1 * | 2/2004 | Liu et al. | 361/684 |
| 2004/0085725 | A1 * | 5/2004 | Liu | 361/685 |
| 2005/0088815 | A1 * | 4/2005 | Chen et al. | 361/685 |
| 2005/0094380 | A1 * | 5/2005 | Mukougawa | 361/724 |
| 2005/0099781 | A1 * | 5/2005 | Ecker et al. | 361/724 |
| 2005/0111178 | A1 * | 5/2005 | Bradley et al. | 361/684 |
| 2005/0162050 | A1 * | 7/2005 | Berger et al. | 312/108 |
| 2005/0194287 | A1 * | 9/2005 | Lien et al. | 206/565 |
| 2005/0281004 | A1 * | 12/2005 | Li | 361/724 |
| 2006/0133022 | A1 * | 6/2006 | Chen et al. | 361/683 |
| 2006/0146490 | A1 * | 7/2006 | Chen et al. | 361/683 |
| 2006/0255703 | A1 * | 11/2006 | Chang | 312/348.4 |
| 2007/0127202 | A1 * | 6/2007 | Scicluna et al. | 361/685 |
| 2007/0152547 | A1 * | 7/2007 | Chen et al. | 312/223.2 |
| 2008/0169738 | A1 * | 7/2008 | Li | 312/223.2 |
| 2008/0202976 | A1 * | 8/2008 | Burgess et al. | 206/558 |
| 2009/0091228 | A1 * | 4/2009 | Tupper et al. | 312/348.4 |
| 2009/0161309 | A1 * | 6/2009 | Yang | 361/679.39 |
| 2010/0102692 | A1 * | 4/2010 | Hammerle | 312/348.4 |
| 2010/0220458 | A1 * | 9/2010 | Sakai et al. | 361/829 |
| 2010/0245710 | A1 * | 9/2010 | Kim | 349/58 |
| 2011/0090639 | A1 * | 4/2011 | Li | 361/679.39 |
| 2011/0114585 | A1 * | 5/2011 | Abene | 211/126.3 |
| 2011/0266405 | A1 * | 11/2011 | Sun | 248/224.8 |
| 2012/0188705 | A1 * | 7/2012 | Ozeki et al. | 361/679.35 |
| 2012/0250244 | A1 * | 10/2012 | Sun | 361/679.33 |
| 2012/0280601 | A1 * | 11/2012 | Watanabe et al. | 312/223.1 |
| 2012/0288248 | A1 * | 11/2012 | Chapa Ramirez et al. | 385/135 |
| 2012/0292266 | A1 * | 11/2012 | Smith et al. | 211/13.1 |
| 2012/0320533 | A1 * | 12/2012 | Zhang et al. | 361/726 |
| 2013/0026323 | A1 * | 1/2013 | Sun | 248/309.1 |
| 2013/0049560 | A1 * | 2/2013 | Liu | 312/348.1 |

* cited by examiner

SUPPORT TRAY FOR SERVER

BACKGROUND

1. Technical Field

The present disclosure relates to mounting apparatuses, and particularly to a support tray for mounting a computing unit of a server to a chassis.

2. Description of Related Art

A high density server, such as a blade server or a multi node server, includes a plurality of computing units, such as blades or nodes, mounted in a chassis of the server. Traditionally, each of the computing units is received in a support tray, which can be conveniently inserted into or drawn out of the chassis. The computing units may have different sizes. Therefore, many trays with different sizes have to be prepared for different-sized computing units. That is uneconomical and inconvenient.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
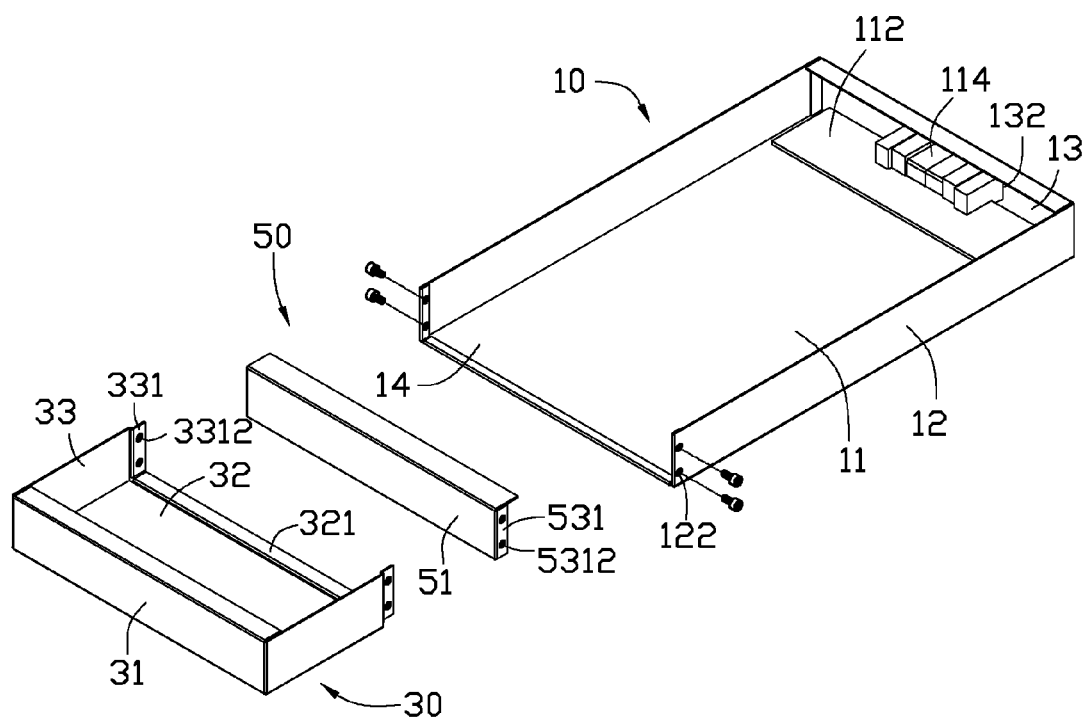
FIG. 1 is an isometric, exploded view of an exemplary embodiment of a support tray.

FIG. 1, is an exemplary embodiment of a support tray. The support tray includes a main body 10, a first cover 30, and a second cover 50.

The main body 10 includes a bottom plate 11, two side plates 12 respectively extending substantially perpendicular up from opposite sides of the bottom plate 11, and an end plate 13 extending up from a rear end of the bottom plate 11 and connected substantially perpendicular between rear ends of the side plates 12. An opening 14 is defined in a front end of the main body 10 opposite to the end plate 13. The end plate 13 defines a plurality of accesses 132. A circuit board 112 is mounted on the bottom plate 11 adjacent to the end plate 13, and includes a plurality of connectors 114 exposed through the corresponding accesses 132 of the end plate 13. Each of the side plates 12 defines two fixing holes 122 adjacent to a front end of the side plate 12 opposite to the end plate 13.

The first cover 30 includes a bottom wall 32, a blocking plate 31 extending substantially perpendicular up from a front side of the bottom wall 32, and two sidewalls 33 respectively extending up from opposite ends of the bottom wall 32 and substantially perpendicular connected to opposite ends of the blocking plate 31. A distance between the sidewalls 33 of the first cover 30 is equal to a distance between the side plates 12 of the main body 10. A connection portion 321 extends from a rear side of the bottom wall 32, and steps up relative to the bottom wall 32. A connection portion 331 extends from a rear end of each of the sidewalls 33, and steps towards the other sidewall 33. Each of the connection portions 331 defines two fastening holes 3312.

The second cover 50 includes a blocking plate 51 and two connection portions 531 respectively extending rearwards from opposite ends of the blocking plate 51. Each of the connection portions 531 defines two fastening holes 5312.

Figure 2:
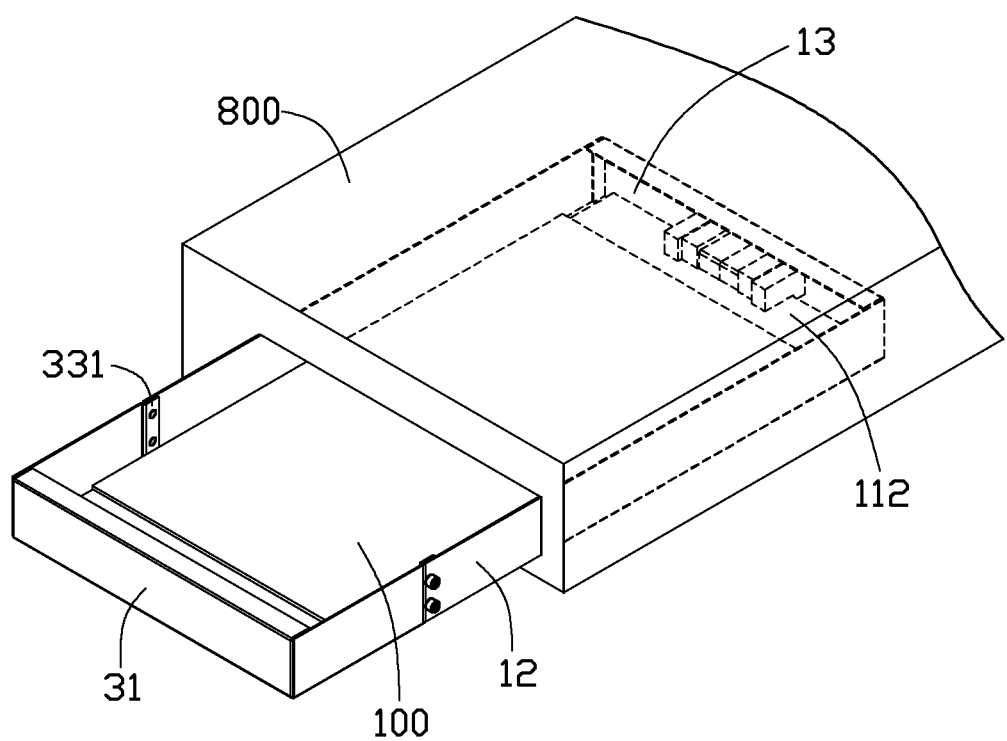
FIG. 2 shows the support tray in a first assembling state, together with a first computing unit and a first chassis.

Referring to FIG. 2, if the support tray is used to mount a first computing unit 100 which has a large length to a first chassis 800, the first cover 30 is connected to the front end of the main body 10 to form a first assembling state of the support tray. The connection portion 321 abuts against a top of the front end of the bottom plate 11 of the main body 10. The connection portions 331 respectively abut against inner sides of the front ends of the side plates 12 of the main body 10, with the fastening holes 3312 aligning with the corresponding fixing holes 122. Four screws extend through the fixing holes 122 of the main body 10 and are secured in the corresponding fastening holes 3312 to fasten the first cover 30 to the main body 10, thereby shielding the opening 14 of the main body 10. A distance between the blocking plate 31 of the first cover 30 and the end plate 13 of the main body 10 is greater than or equal to a length of the first computing unit 100, thus, the first computing unit 100 can be received in a space bound by the main body 10 and the first cover 30. The front end of the main body 10 is inserted into the first chassis 800. The first computing unit 100 is electrically connected to the circuit board 112, to be connected to other electronic devices through the connectors 114.

Figure 3:
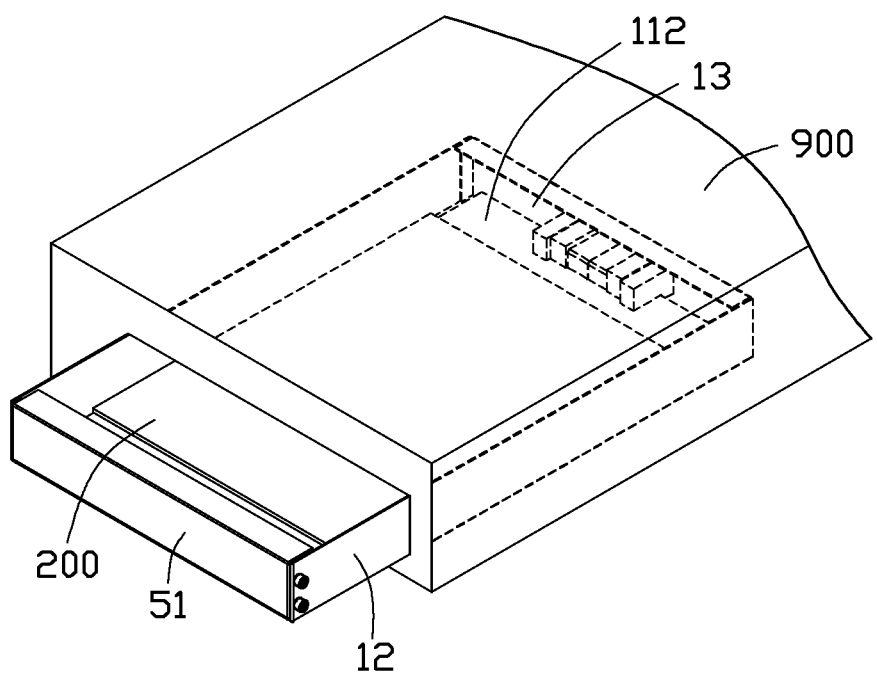
FIG. 3 shows the support tray in a second assembling state, together with a second computing unit and a second chassis.

Referring to FIG. 3, if the support tray is used to mount a second computing unit 200 with a length less than the first computing unit 200 to a second chassis 900, the second cover 50 is connected to the front end of the main body 10 to form a first assembling state of the support tray. The connection portions 531 respectively abut against inner sides of the front ends of the side plates 12 of the main body 10, with the fastening holes 5312 aligning with the corresponding fixing holes 122. Four screws extend through the fixing holes 122 of the main body 10 and are secured in the corresponding fastening holes 5312 of the second cover 50 to fix the second cover 50 to the main body 10, thereby shielding the opening 14 of the main body 10. A distance between the blocking plate 51 of the second cover 50 and the end plate 13 of the main body 10 is greater than or equal to a length of the second computing unit 200, thus, the second computing unit 200 can be received in a space bound by the main body 10 and the second cover 50. The front end of the main body 10 can be inserted into a second chassis 900. The second computing unit 200 is electrically connected to the circuit board 112, to be connected to other electronic devices through the connectors 114.

Since the distance between the sidewalls 33 of the first cover 30 is equal to the distance between the side plates 12 of the main body 10, the first cover 30 is adapted to be inserted into the first chassis 800 when the first computing unit 100 is detached from the first chassis 800. Thus, preventing air from bypassing an opening of the first chassis 800. Similarly, the first cover 30 can be inserted into the second chassis 900 for air blocking.

It is to be understood, however, that even though numerous characteristics and advantages of the embodiment have been set forth in the foregoing description, together with details of the structure and function of the embodiment, the disclosure is illustrative only, and changes may be made in detail, especially in the matters of shape, size, and arrangement of parts within the principles of the present disclosure to the full extent indicated by the broad general meaning of the terms in which the appended claims are expressed.

What is claimed is:

1. A support tray for mounting either a first computing unit to a first chassis, or a second computing unit that is shorter than the first computing unit to a second chassis, the support tray comprising:
   a main body defining an opening in a front end of main body, and comprising an end plate at a rear end of the main body opposite to the opening;
   a first cover comprising a first blocking plate; and
   a second cover comprising a second blocking plate;
   wherein either the first cover or the second cover is assembled to the main body; the first blocking plate shields the opening of the main body and is spaced from the end plate of the main body in a distance greater than or equal to a length of the first computing unit, in response to the first cover being assembled to the main body; the second blocking plate shields the opening of the main body and is spaced from the end plate of the main body in a distance greater than or equal to a length of the second computing unit, but less than the length of the first computing unit, in response to the second cover being assembled to the main body;
   wherein the main body further comprises a bottom plate, and two side plates extending up from opposite sides of the bottom plate in a substantially perpendicular manner, the end plate of the main body extends up from a rear end of the bottom plate and is connected between the side plates of the main body;
   wherein the first cover further comprises a bottom wall extending rearwards from a bottom of the first blocking plate in a substantially perpendicular manner, and two sidewalls respectively extending up from opposite sides of the bottom wall in a substantially perpendicular manner and correspondingly connected to opposite ends of the first blocking plate;
   a connection portion extends from a rear end of each of the sidewalls, and defines a fastening hole, wherein a fixing hole is defined in each of the side plates of the main body adjacent to the front end of the main body; the fixing holes of the main body correspondingly align with the fastening holes of the first cover to allow two fasteners to extend through the fixing holes and be fastened in the fastening holes, in response to the first cover being assembled to the main body;
   wherein a distance between the sidewalls of the first cover is equal to a distance between the side plates of the main body.

2. The support tray of claim 1, wherein the second cover further comprises two connection portions respectively extending rearwards from opposite ends of the second blocking plate, each of the connection portions of the second cover defines a fastening hole; wherein the fixing holes of the main body correspondingly align with the fastening holes of the second cover to allow two fasteners to extend through the fixing holes and be fastened in the fastening holes of the second cover, in response to the second cover being assembled to the main body.

* * * * *